US006718331B2

(12) United States Patent
Davis et al.

(10) Patent No.: US 6,718,331 B2
(45) Date of Patent: Apr. 6, 2004

(54) METHOD AND APPARATUS FOR LOCATING INTER-ENTERPRISE RESOURCES USING TEXT-BASED STRINGS

(75) Inventors: Nathan Eugene Davis, Austin, TX (US); Peter W. Herman, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 09/736,583

(22) Filed: Dec. 14, 2000

(65) Prior Publication Data

US 2002/0078000 A1 Jun. 20, 2002

(51) Int. Cl.[7] .............................................. G06F 17/30
(52) U.S. Cl. .......................................... 707/10; 709/219
(58) Field of Search ............................... 707/3; 709/219

(56) References Cited

U.S. PATENT DOCUMENTS

| | | | |
|---|---|---|---|
| 5,860,072 A | | 1/1999 | Schofield ..................... 707/101 |
| 5,878,219 A | * | 3/1999 | Vance et al. .................. 709/203 |
| 5,964,891 A | * | 10/1999 | Caswell et al. ............... 714/31 |
| 5,987,247 A | | 11/1999 | Lau ............................. 395/702 |
| 5,987,471 A | * | 11/1999 | Bodine et al. ................ 345/764 |
| 5,999,944 A | * | 12/1999 | Lipkin ......................... 345/502 |
| 6,023,578 A | | 2/2000 | Birsan et al. ................. 395/702 |
| 6,064,977 A | * | 5/2000 | Haverstock et al. ........... 705/9 |
| 6,094,649 A | * | 7/2000 | Bowen et al. ................. 707/3 |
| 6,101,537 A | * | 8/2000 | Edelstein et al. ............ 709/219 |
| 6,125,400 A | | 9/2000 | Cohen et al. ................ 709/247 |
| 6,185,598 B1 | * | 2/2001 | Farber et al. ................ 709/200 |
| 6,212,556 B1 | * | 4/2001 | Arunachalam .............. 709/219 |
| 6,222,533 B1 | * | 4/2001 | Notani et al. ................ 345/733 |
| 6,338,082 B1 | * | 1/2002 | Schneider ................... 709/203 |
| 6,339,423 B1 | * | 1/2002 | Sampson et al. ........... 345/854 |
| 6,348,927 B1 | * | 2/2002 | Lipkin ......................... 345/619 |
| 6,496,867 B1 | * | 12/2002 | Beser et al. ................. 709/245 |
| 2002/0161745 A1 | * | 10/2002 | Call ............................... 707/1 |

* cited by examiner

*Primary Examiner*—Wayne Amsbury
*Assistant Examiner*—Cam-Linh Nguyen
(74) *Attorney, Agent, or Firm*—Duke W. Yee; David A. Mims, Jr.; Wayne P. Bailey (57) ABSTRACT

A standard format is provided for a text string called an enterprise identifier, which acts as a handle to access resources from disparate sources and technologies. Enterprise identifiers use extensible markup language format to allow a resource identifier to be created manually without accessing the resource. The identifier may be passed between enterprises via business-to-business connection, e-mail, telephone, or facsimile. Data may be extracted from the identifier for display or programmatic use without accessing the resource, thus avoiding unnecessary data access and transfer

25 Claims, 6 Drawing Sheets

METHOD AND APPARATUS FOR LOCATING INTER-ENTERPRISE RESOURCES USING TEXT-BASED STRINGS

BACKGROUND OF THE INVENTION

1. Technical Field

The present invention relates to enterprise resources and, in particular, to accessing resources with disparate sources and technologies. Still more particularly, the present invention provides a method, apparatus, and program for locating inter-enterprise resources using text-based strings.

2. Description of Related Art

Enterprise Java Beans (EJB) is a component software architecture from Sun that is used to build Java applications that run in a server. EJB uses a "container" layer that provides common functions such as security and transaction support and delivers a consistent interface to applications regardless of the type of server. Components are program modules that are designed to interoperate with each other at runtime. Components may be written by different programmers using different development environments and they may or may not be platform independent. Components can be run in stand-alone machines, on a LAN, intranet or the Internet.

The terms component and object are used synonymously. Component architectures have risen out of object-oriented technologies, but the degree to which they comply to all the rules of object technology is often debated. Component architectures may use a client/component model, in which the client application is designed as the container that holds other components or objects. The client container is responsible for the user interface and coordinating mouse clicks and other inputs to all the components. A pure object model does not require a container. Any object can call any other without a prescribed hierarchy.

Common Object Request Broker Architecture (CORBA) defines the communication protocols and datatype mappings for EJBs. CORBA is a standard from the Object Management Group (OMG) for communicating between distributed objects. CORBA provides a way to execute programs (objects) written in different programming languages running on different platforms no matter where they reside in the network. Technically, CORBA is the communications component of the Object Management Architecture (OMA), which defines other elements such as naming services, security service, and transaction services.

A naming service is software that converts a name into a physical address on a network, providing logical to physical conversion. Names can be user names, computers, printers, services, or files. The transmitting station sends a name to the server containing the naming service software, which sends back the actual address of the user or resource. The process is known as name resolution. A naming service functions as a White Pages for the network.

CORBA defines an Inter-ORB-reference (IOR), which may be externalized as a text string; however, an IOR is not human-readable or interpretable and applies only to CORBA objects. Microsoft Component Object Model (COM), which defines a structure for building program routines that can be called up and executed in a Windows™ environment, defines a moniker as a generalized resource handle that can be externalized as human readable. However, monikers require binding to the resource and apply only to COM objects. The prior art fails to provide a standard method for identifying and accessing resources across technologies, such as EJB, CORBA, and COM.

Therefore, it would be advantageous to provide a method, apparatus, and program for locating inter-enterprise resources using human readable text-based strings.

SUMMARY OF THE INVENTION

The present invention provides a standard format for a text string called an enterprise identifier, which acts as a handle to access resources from disparate sources and technologies. Enterprise identifiers use extensible markup language (XML) format to allow a resource identifier to be created manually without accessing the resource. The identifier may be easily passed between enterprises via business-to-business connection, e-mail, telephone, or facsimile. Data may be extracted from the identifier for display or programmatic use without accessing the resource, thus avoiding unnecessary data access and transfer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
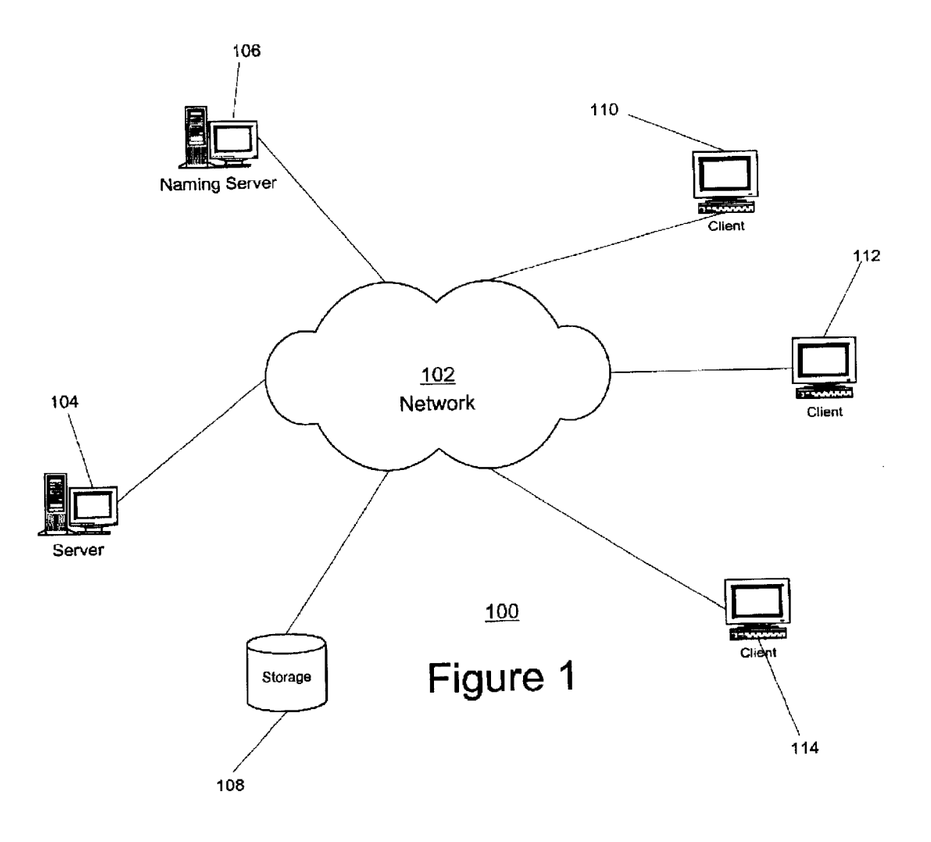
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 106 are connected to network 102 along with storage unit 108. In addition, clients 110, 112, and 114 also are connected to network 102. These clients 110, 112, and 114 may be, for example, personal computers or network computers. In the depicted example, server 104 provides data, such as boot files, operating system images, and applications to clients 110–114. Clients 110, 112, and 114 are clients to server 104. Network data processing system 100 may include additional servers, clients, and other devices not shown. For example, naming server 106 may provide a naming service for resource provided in the network, such as those provided by server 104. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In accordance with a preferred embodiment of the present invention, an Enterprise Identifier (EI) provides information necessary for a client application to obtain a reference to an enterprise resource instance, which may be local to the client machine, remote within the enterprise or business domain (intra-enterprise), or remote in another enterprise or business domain (inter-enterprise). The EI is a text-based handle with enough intelligence to obtain information from various sources, depending on the circumstances, and return a reference to a resource instance in as specific a manner as possible. The EI is simple enough to construct manually, such as through e-mail or over the telephone.

The EI string is comprised of address information and optional attributes, described in extensible markup language (XML) and Document Type Definition (DTD). DTD is a language that describes the contents of an standard generalized markup language (SGML) document. The DTD is also used with XML, and the DTD definitions may be embedded within an XML document or in a separate file. The DTD may also contain data type information.

Figure 2:
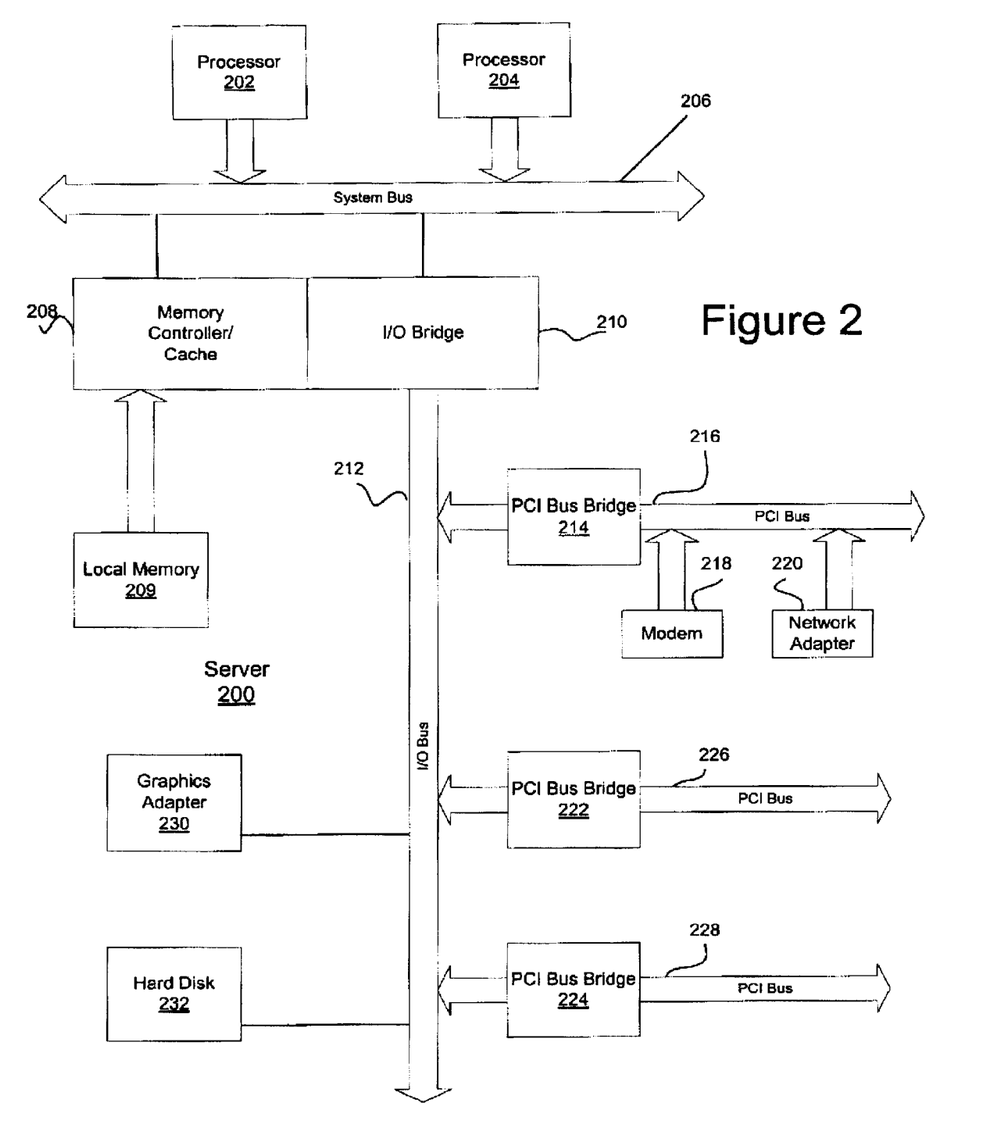
FIG. 2 is a block diagram of a data processing system that may be implemented as a server in accordance with a preferred embodiment of the present invention.

Referring to FIG. 2, a block diagram of a data processing system that may be implemented as a server, such as servers 104, 106 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
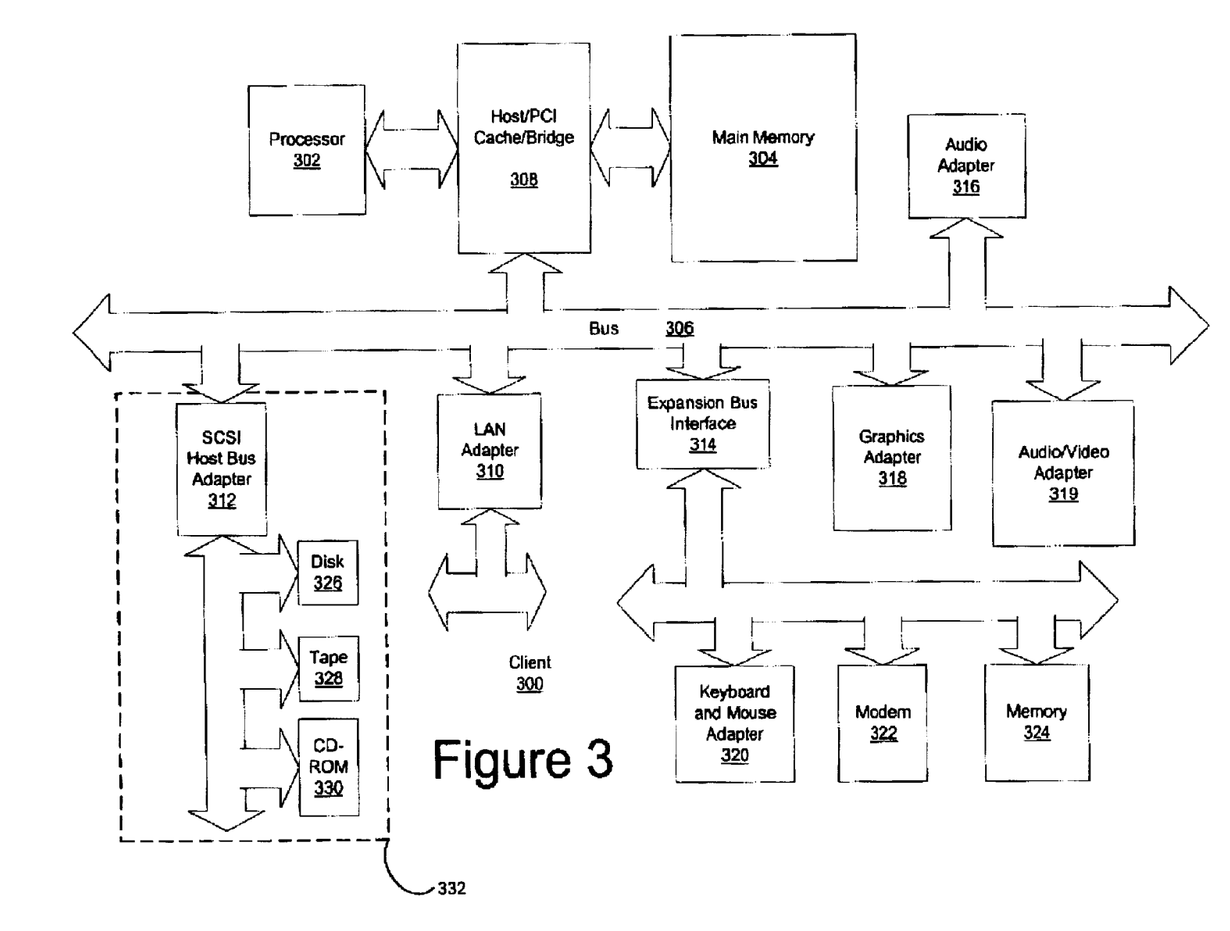
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
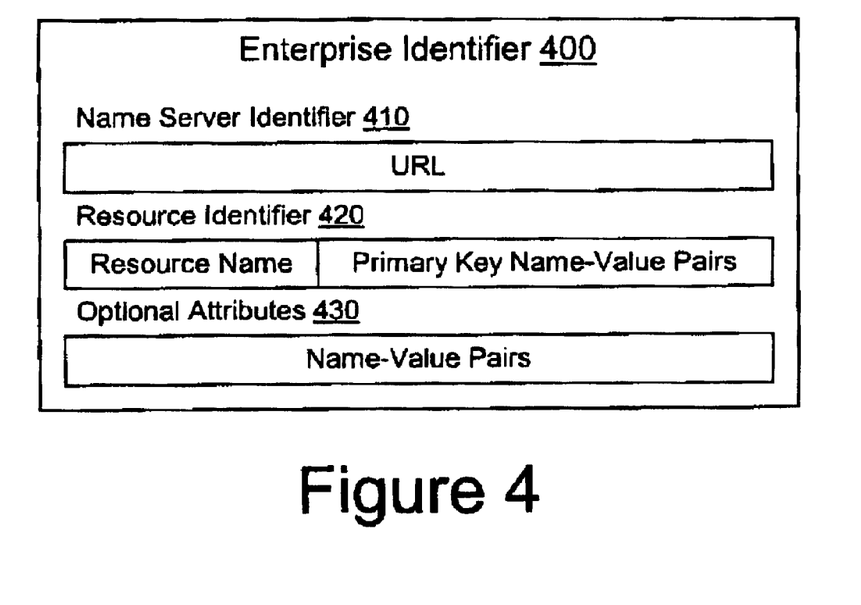
FIG. 4 is an exemplary EI string for a resource in an EJB environment in accordance with a preferred embodiment of the present invention.

With reference now to FIG. 4, an exemplary EI string for a resource in an EJB environment is shown in accordance with a preferred embodiment of the present invention. Enterprise Identifier 400 includes a name server identifier 410, a resource identifier 420, and optional attributes 430. Name server identifier 410 points to the location of the name server used to resolve the EI reference. The uniform resource locator (URL) protocol value is used to distinguish between name server types for making connections and queries. For example, an EJB name server would be prefixed by "iiop", and a lightweight directory access protocol (LDAP) name server would be prefixed by "ldap".

The URL portion of the EI string points to the name server to be used for resolving the EI reference. In homogeneous namespaces, such as for EJBs within an enterprise, this may simply be the URL of an EJB name server. Heterogeneous namespaces, such as between EJBs and COM objects, or homogeneous namespaces that cross enterprise boundaries may require use of a shared global name server, such as an LDAP directory.

Resource identifier 420 includes a resource name and primary key, the latter in name-value pairs with optional data types. Resource name may vary according to the resource type, which could be a home or factory lookup name for an EJB, or an object lookup name for an LDAP entry, with the communications protocols being determined by the server type as given in the domain namespace identifier. Primary key values are not necessary for serialized Java objects.

Optional attributes 430 are not used in resolving the EI, but can be used to hold additional information, such as a "short name" value. The optional attributes comprise name-value pairs. It should be emphasized that the above example does not in any way constrain the EI format when used in other application environments or with other naming schemes, because both the format and supporting programming logic are soft configurable so as to apply potentially to any named enterprise resource. For example, the use of monikers in COM may be adaptable to EIs.

An EI object created from an EI string may have the following methods.

newEIObject(EI string)—creates an instance of an EI, which in the EJB environment will typically be stored using a container—or bean-managed persistence (the persistence mechanism is transparent to the EI).

getObject( )—returns an object narrowed to the most specific type that can be determined at run time. For EJBs, at a minimum this is an EJBObject. Serialized Java objects do not need narrowing.

getEIString( )—returns the object's EI string.

getAttribute(String attributeName)—returns an arbitrary named attribute, such as a "short name".

setAttribute(String attributeName Object attributeValue)—modifies an arbitrary named attribute (assuming that it is mutable).

Figure 5:
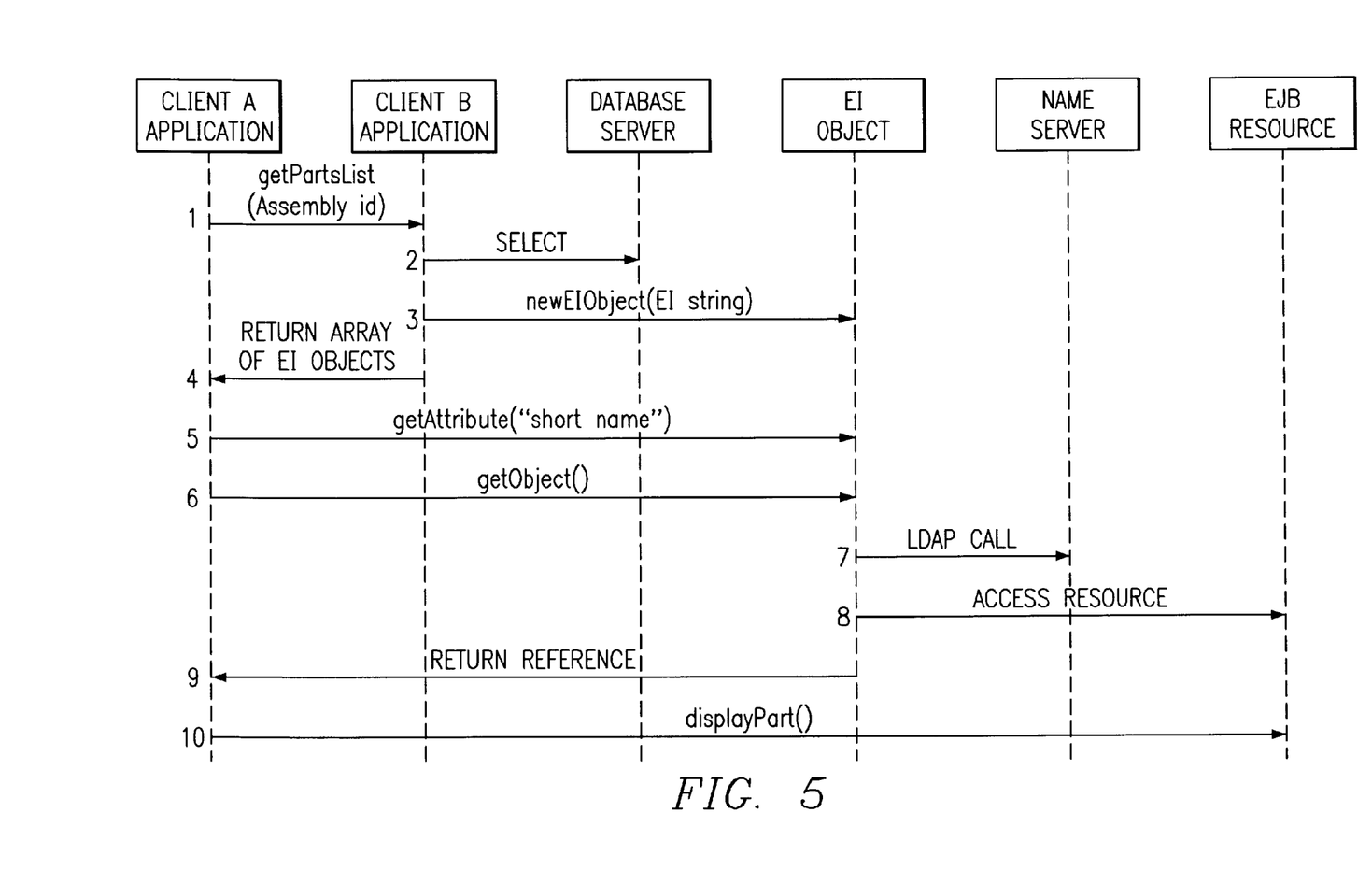
FIG. 5 is a data flow diagram of resource access between enterprises using an Enterprise Identifier in accordance with a preferred embodiment of the present invention.

With reference now to FIG. 5, a data flow diagram of resource access between enterprises using an Enterprise Identifier is shown in accordance with a preferred embodiment of the present invention. In this example, a client in enterprise A accesses a specific part using a list of EIs provided by enterprise B. For simplicity, it is assumed that both enterprises deploy their applications in the EJB environment.

In step 1, using normal EJB protocols, a client A application invokes a "getPartsList" method on an Assembly object in enterprise B. Internet transport and security mechanisms are pre-defined according to the operative business or trading partner agreement and thus are outside the EI scope.

In step 2 the enterprise B Assembly object server acts as client to do a "SELECT" on a relational database (RDB), which returns the primary keys of the assembly's component parts. This is a relatively lightweight approach. Alternatively, the Assembly could query the Part objects' home to return a collection of references. Using the returned primary keys, in step 3 the Assembly object creates the associate EI objects. Optional attributes values such as for "short name" may be obtained either via the RDB query or via "get" requests to the actual Part object instances, depending on how the application is written.

At the completion of the "getPartsList" method, in step 4 the Assembly object returns an array of EI objects. In this example, the client never deals directly with the EI strings. However, these strings may also have been returned in text format for use in e-mail or similar applications.

In step 5 client A populates the desktop with icons representing parts in the assembly. For each icon, client A calls an EI object's "getAttribute" method to obtain the "short name" value. Because this value is stored in the EI object, no actual resource access is needed. In step 6 the human user clicks on a specific part icon for display, which causes client A to invoke the associated EI object's (now on the client machine) "getObject" method.

Let's assume that the EJB home or factory name is stored as an LDAP entry for inter-enterprise access. In step 7 the EI object makes a call to the LDAP directory, which returns the EJB home or factory location of the part resource, which in turn the EI object uses to access the part instance in step 8 and return its narrowed reference to client A in step 9.

Finally, in step 10 client A invokes the "displayPart( )" method on the part instance, just as if the EI were not involved.

Figure 6:
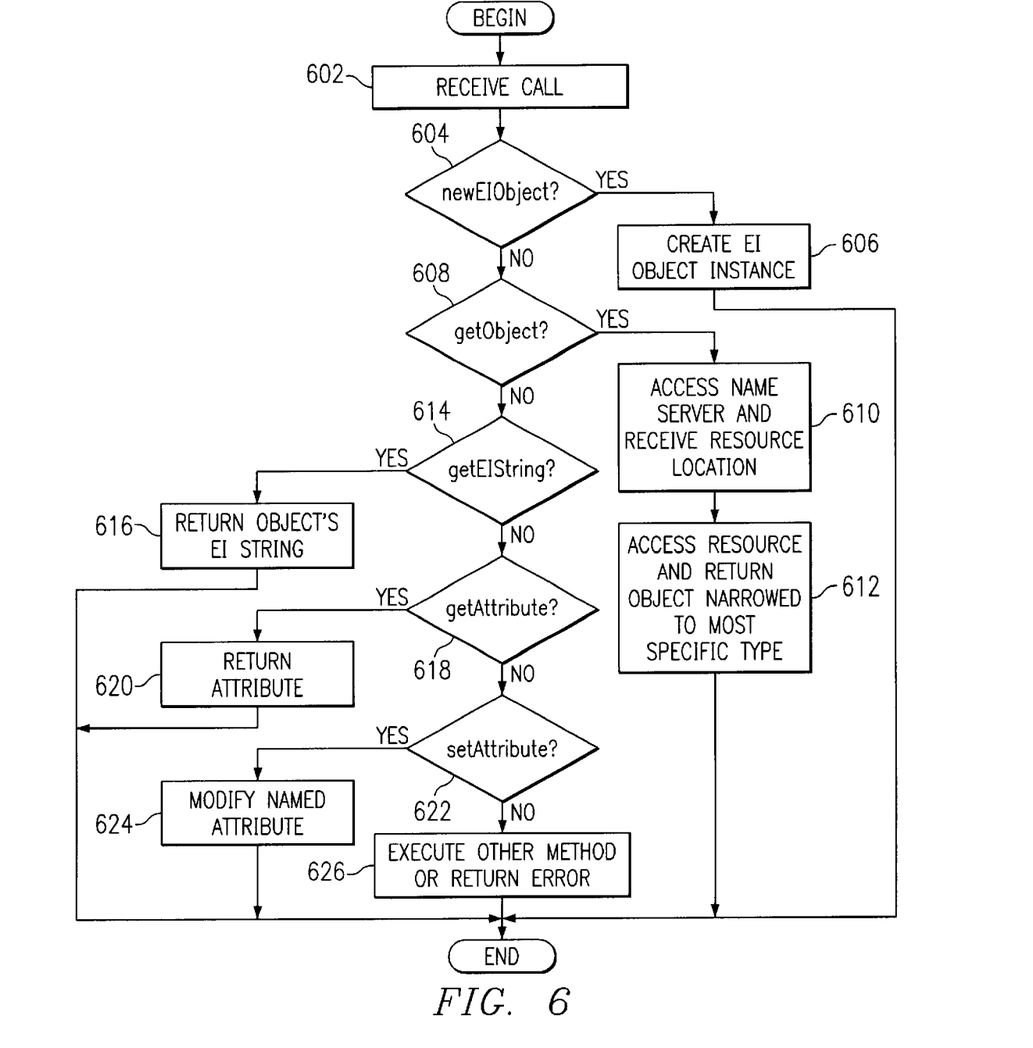
FIG. 6 is a flowchart of the operation of an EI object receiving a call in accordance with a preferred embodiment of the present invention.

With reference now to FIG. 6, a flowchart of the operation of an EI object receiving a call is illustrated in accordance with a preferred embodiment of the present invention. The process begins and receives a call (step 602). A determination is made as to whether the call is to the "newEIObject(EI String)" method (step 604). If the call is to the "newEIObject" method, the process creates an instance of the EI object (step 606) and ends.

If the call is not to the "newEIObject" method in step 604, a determination is made as to whether the call is to the "getObject( )" method (step 608). If the call is to the "getObject" method, the process access the name server and receives the resource location (step 610). Then, the process access the resource and returns to the caller the object narrowed to the most specific type (step 612) and ends.

If the call is not to the "getObject" method in step 608, a determination is made as to whether the call is to the "getEIString( )" method (step 614). If the call is to the "getEIString" method, the process returns the EI objects EI string (step 616) and ends. If the call is not to the "getEIString" method in step 614, a determination is made as to whether the call is to the "getAttribute(String attributeName)" method (step 618). If the call is to the "getAttribute" method, the process returns the named attribute, such as "short name," and ends.

If the call is not to the "getAttribute" method in step 618, a determination is made as to whether the call is to the "setAttribute(String attributeName Object attributeValue)" method (step 622). If the call is to the "setAttribute" method, the process modifies the named attribute (step 624) and ends. If the call is not to the "setAttribute" method in step 622, the process executes the called method or returns an error if the called method cannot be executed (step 626). Thereafter, the process ends.

Thus, the present invention solves the disadvantages of the prior art by providing an Enterprise Identifier (EI). An EI provides the necessary information such that a client application can obtain a reference to an enterprise resource instance. The EI must support multiple naming schemes and application environments. In order to provide this degree of flexibility, an EI relies upon XML as a self-describing grammar for the identifier format and Java and other vendor-neutral technologies for using the identifier in order to obtain a specific resource reference. The EI conceptual framework is intended to be readily adaptable for proprietary technologies. The identifier may be easily passed between enterprises via business-to-business connection, e-mail, telephone, or facsimile. Data may be extracted from the identifier for display or programmatic use without accessing the resource, thus avoiding unnecessary data access and transfer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for locating a resource using a text-based string, comprising machine implemented steps of:
   receiving an identification of the resource; and
   creating an enterprise identifier including a name server identifier and a resource identifier for the resource, wherein the name server identifier points to a location of a name server used to resolve reference to the enterprise identifier.

2. The method of claim 1, wherein the enterprise identifier comprises a text string.

3. The method of claim 1, wherein the name server identifier comprises a uniform resource locator.

4. The method of claim 1, wherein the resource identifier comprises a resource name and at least one primary key name-value pair.

5. The method of claim 1, wherein the enterprise identifier is created without accessing the resource.

6. The method of claim 1, wherein the name server converts the resource identifier for the resource to an address for the resource.

7. A method for locating a resource using a text-based string, comprising machine implemented steps of:
   receiving an identification of the resource; and
   creating an enterprise identifier for subsequent use in a request to locate the resource, said enterprise identifier including a name server identifier and a resource identifier for the resource, wherein the enterprise identifier comprises an object-oriented programming object.

8. A method for locating a resource using a text-based string, comprising machine implemented steps of:
   receiving an identification of the resource; and
   creating an enterprise identifier for subsequent use in a request to locate the resource, said enterprise identifier including a name server identifier and a resource identifier for the resource, wherein the enterprise identifier further includes at least one optional attribute of the resource.

9. The method of claim 8, wherein the at least one optional attribute comprises at least one name-value pair.

10. The method of claim 8, wherein the at least one optional attribute includes a short name.

11. The method of claim 10, further comprising:
    displaying the short name in association with an icon representing the enterprise identifier.

12. An article of manufacture for locating a resource using a text-based string, comprising:
    receipt means for receiving an identification of the resource; and
    creation means for creating an enterprise identifier including a name server identifier and a resource identifier for the resource, wherein the name server identifier points to a location of a name server used to resolve reference to the enterprise identifier.

13. The article of manufacture of claim 12, wherein the enterprise identifier comprises a text string.

14. The article of manufacture of claim 12, wherein the name server identifier comprises a uniform resource locator.

15. The article of manufacture of claim 12, wherein the resource identifier comprises a resource name and at least one primary key name-value pair.

16. The article of manufacture of claim 12, wherein the enterprise identifier is created without accessing the resource.

17. The apparatus of claim 12, wherein the name server converts the resource identifier for the resource to an address for the resource.

18. An article of manufacture for locating a resource using a text-based string, comprising:
    receipt means for receiving an identification of the resource; and
    creation means for creating an enterprise identifier for subsequent use in a request to locate the resource, said enterprise identifier including a name server identifier and a resource identifier for the resource, wherein the enterprise identifier comprises an object-oriented programming object.

19. An article of manufacture for locating a resource using a text-based string, comprising:

receipt means for receiving an identification of the resource; and creation means for creating an enterprise identifier for subsequent use in a request to locate the resource, said enterprise identifier including a name server identifier and a resource identifier for the resource, wherein the enterprise identifier further includes at least one optional attribute of the resource.

20. The article of manufacture of claim 19, wherein the at least one optional attribute comprises at least one name-value pair.

21. The article of manufacture of claim 19, wherein the at least one optional attribute includes a short name.

22. The article of manufacture of claim 21, further comprising:

means for displaying the short name in association with an icon representing the enterprise identifier.

23. A computer program product, in a computer readable medium, for locating a resource using a text-based string, comprising:

instructions for receiving an identification of the resource; and instructions for creating an enterprise identifier including a name server identifier and a resource identifier for the resource, wherein the name server identifier points to a location of a name server used to resolve reference to the enterprise identifier.

24. The computer program product of claim 23, wherein the name server converts the resource identifier for the resource to an address for the resource.

25. An article of manufacture comprising a computer usable medium having an enterprise identifier object embodied therein for providing access to a resource instance, the enterprise identifier object comprising:

a method for creating an instance of an enterprise identifier;

a method for returning an object corresponding to the enterprise identifier object;

a method for returning an enterprise identifier text string corresponding to the enterprise identifier object;

a method for returning an attribute corresponding to the enterprise identifier object; and a method for modifying an attribute corresponding to the enterprise identifier object.

\* \* \* \* \*